ary Examiner—Theodore A. Granger
United States Patent [19]
Smith, Jr.

[11] 4,219,423
[45] Aug. 26, 1980

[54] AIR-INJECTION CLEANING SYSTEM FOR LIQUID FILTERS

[75] Inventor: Clarence G. Smith, Jr., Mountaintop, Pa.

[73] Assignee: Muskin Corporation, Wilkes Barre, Pa.

[21] Appl. No.: 946,139

[22] Filed: Sep. 27, 1978

[51] Int. Cl.² ............................................. E04H 3/16
[52] U.S. Cl. ............................. 210/169; 210/416 AS; 261/DIG. 75
[58] Field of Search ............................. 210/169, 416; 261/DIG. 75

[56] References Cited

U.S. PATENT DOCUMENTS

| | | | |
|---|---|---|---|
| 3,282,227 | 11/1966 | Nielson | 261/DIG. 75 |
| 3,371,789 | 3/1968 | Hense | 210/169 |
| 3,637,331 | 1/1972 | Smith et al. | 210/416 |
| 3,640,516 | 2/1972 | Williger | 210/169 |
| 3,669,883 | 6/1972 | Huckstedt | 210/169 X |
| 3,738,620 | 6/1973 | Ennis | 210/169 |
| 3,767,050 | 10/1973 | Reiner | 210/169 |
| 3,853,481 | 12/1974 | Murray | 210/169 |
| 3,943,580 | 3/1970 | Carter | 210/169 |
| 3,996,139 | 12/1976 | Prince et al. | 210/416 R |

Primary Examiner—Theodore A. Granger
Attorney, Agent, or Firm—Christie, Parker & Hale

[57] ABSTRACT

A pump and filter assembly suitable for circulating and filtering swimming-pool water is provided with a normally closed air-injection valve to aerate water flowing into a filtration element in the filter. When the exterior surfaces of the element become covered with dirt or filter cake, the air-injection valve and an auxiliary filter outlet are opened. Air aspirated through the valve into the filter inlet water stream causes a churning cleaning action which dislodges the dirt, and the debris-laden water is discharged through the auxiliary outlet without passing through the element.

6 Claims, 3 Drawing Figures

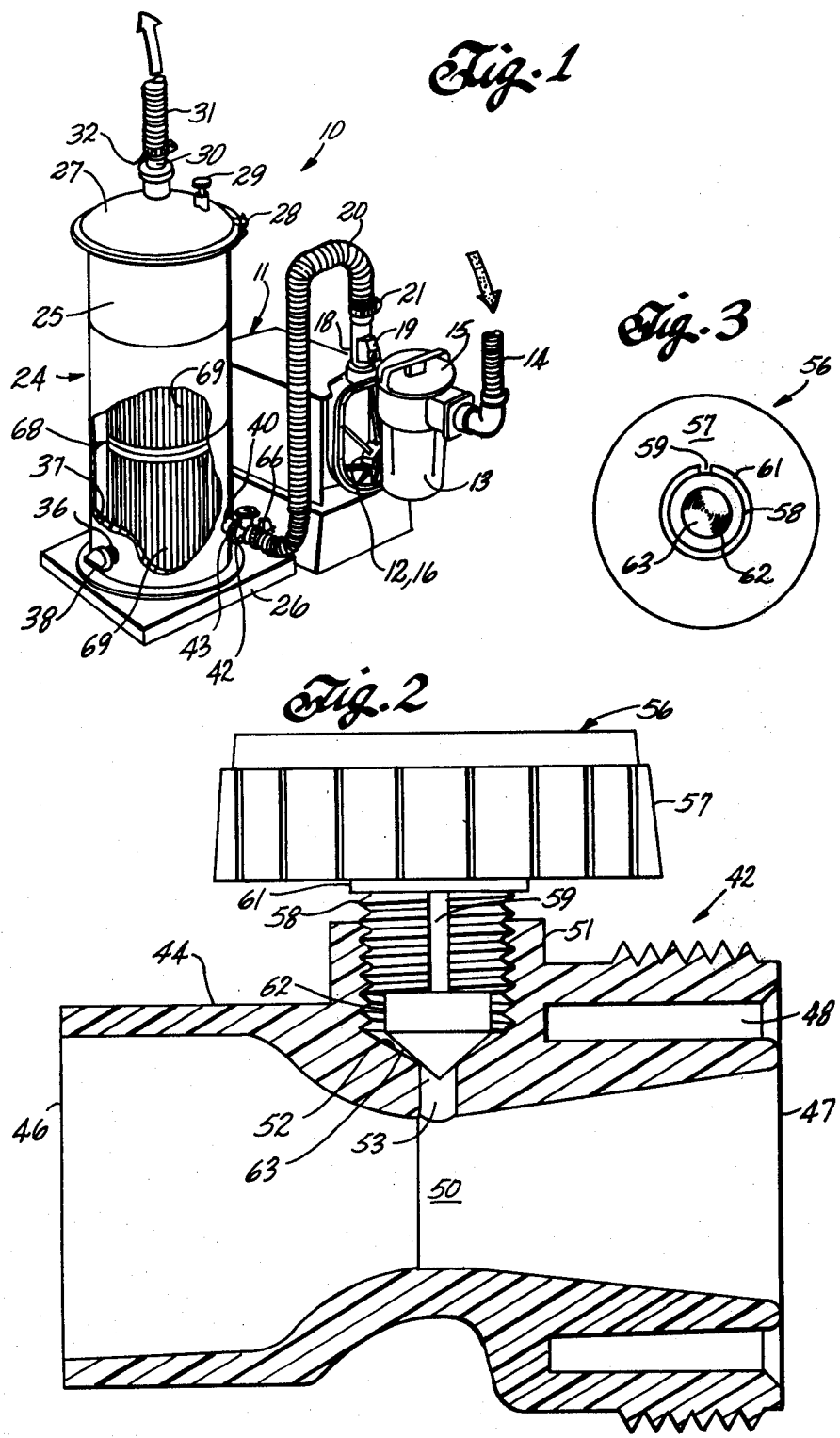

AIR-INJECTION CLEANING SYSTEM FOR LIQUID FILTERS

BACKGROUND OF THE INVENTION

Fluid filters are commercially available in a variety of styles for filtration of flowing liquids such as water. A typical filter consists of a tank having an inlet for receiving unfiltered liquid, and an outlet for discharging the filtrate. A filtration element is positioned within the tank between the inlet and outlet for removing dirt and particulate matter from the liquid stream passing through the tank.

Filters of this type are in widespread use for filtration of swimming-pool water. Circulation and filtering of pool water is essential to maintain the water in hygienic condition, and to remove dirt particles, leaves, insects and other debris falling on the pool surface.

In a typical home swimming-pool installation, water is drawn from the pool by an electrically driven pump, the outlet of which delivers water under pressure to flow through a purifying filter before being returned to the pool. Systems of this type are typically provided with a strainer or equivalent trap upstream of the pump for removing hair and large particulate materials from the liquid stream before it passes through the pump.

In conventional domestic installations of the type just described, the filtration element is typically a cartridge (or several stacked cartridges) incorporating a filtration material such as diatomaceous earth or a cloth or plastic material which permits fluid flow therethrough, but blocks the flow of particulate materials. In operation, dirt builds up on the filter surfaces which receive the incoming water, and fluid flow through the filter gradually diminishes due to the accumulation of this filter cake. The element must accordingly be periodically removed and cleaned to maintain reasonable flow rates and optimum filtering efficiency.

Cleaning of the filter cartridge is a time-consuming and messy operation which requires unsealing of the tank, removal of the cartridge, washing of the cartridge surface to dislodge accumulated dirt, and reassembly of the system. Most pool owners view this task as an unpleasant duty, and cleaning is often deferred to a point where the filter cartridge becomes badly clogged and is unable to maintain the pool water in sparkling clean condition.

The improvement of this invention largely eliminates the need for frequent dismantling of the filter assembly to clean the filter element. A normally closed air-injection valve is provided in the filter inlet conduit, or at another location on the filter tank, and the valve can be opened to inject air into the flowing stream of unfiltered water. When the need for cartridge cleaning is indicated by either visual inspection or an increase in upstream pressure, the air-injection valve is opened, and an auxiliary filter-tank drain is also opened. Aerated water from the pump then flows against and churns around the clogged surfaces of the cartridge, dislodging dirt and other particulate matter which is exhausted with the water streaming out of the auxiliary outlet without being returned to the pool. The entire aerated-water cleaning cycle requires only a minute or two, and periodic cleaning in this mode greatly extends the time before which dismantling and conventional cartridge washing is required.

Filter-element cleaning using the air-injection valve is very simple, and requires only opening of the injection valve, and an auxiliary-outlet valve or plug. The necessary additional parts for the filter system add little in cost or complexity, and the ease with which the filter can be cleaned insures that the cartridge will be maintained in optimum operating condition.

SUMMARY OF THE INVENTION

Briefly stated, this invention relates to an improved liquid filter which incorporates a means for controllably injecting air into incoming liquid during a filter-element cleaning cycle. Air bubbles in the aerated liquid expand and burst against the filter cake of accumulated dirt on the upstream side of the permeable element, dislodging the dirt to be carried away by the water stream which is discharged through an auxiliary outlet which is opened for the cleaning cycle. Preferably, the air-injection means is an aspirating valve having a venturi positioned in the conduit which delivers unfiltered liquid to the filter.

DESCRIPTION OF THE DRAWINGS

FIG. 1 is a pictorial view of a filter assembly incorporating the invention:

FIG. 2 is a sectional elevation of a filter-tank inlet coupling incorporating an air-injection valve; and FIG. 3 is a bottom view of the valve closure member shown in FIG. 2.

DESCRIPTION OF THE PREFERRED EMBODIMENT

A filtration system 10 suitable for filtering swimming pool water is shown in FIG. 1. The system includes a conventional electrically driven pump 11 having an inlet fitting 12. A conventional upstream strainer or trap 13 has an inlet line 14 for pumping unfiltered water from the pool. The strainer includes a removable cap 15 enabling removal of a strainer element (not shown) for cleaning, and the strainer also has an outlet fitting 16 which is connected to inlet fitting 12 of the pump. An outlet fitting 18 is provided on the housing of pump 11, and a line-pressure indicator 19 monitors pressure of water downstream of the pump. A flexible conduit or hose 20 is secured to outlet fitting 18 by a conventional clamp 21.

Positioned adjacent the pump is a filter assembly 24 which includes an upright and generally cylindrical tank 25 supported on a base 26. A removable cover 27 is fitted over the top of the tank, and is secured in place by a ring clamp 28. Mounted on the cover are an air-bleed valve 29 and a filter outlet fitting 30. A flexible conduit or hose 31 is connected by a clamp 32 to fitting 30, and filtered water from filter assembly 24 is delivered through this hose back to the pool.

An auxiliary-drain outlet fitting 36 is mounted at the lower end of a sidewall 37 of tank 25, and this fitting is externally threaded to receive a closure cap 38 which is left in place during normal filter operation. Alternatively, the auxiliary-drain fitting may be provided with a plug, or a conventional valve.

A filter inlet fitting 40 is secured to and extends through sidewall 37 at the bottom of the tank. The inlet fitting is tangentially positioned with respect to the inner circumference of the tank so water flowing through the fitting is induced to swirl and circulate circumferentially within the tank.

An air-injector valve 42 is secured to inlet fitting 40 by a conventional slip nut 43. Valve 42 includes a body 44 as shown in detail in FIG. 2. The body is generally cylindrical, and has an inlet end 46, and an externally threaded outlet end 47 which receives slip nut 43. An annular recess 48 in the outlet end receives the end of filter inlet fitting 40, and these components are clamped together and sealed by slip nut 43.

The inner surface of body 44 has a constriction 50 forming a venturi. Centrally positioned above constriction 50 is an internally threaded boss 51, the undersurface of which defines a tapered valve seat 52. A passage 53 is formed through the sidewall of body 44 between seat 52 and the interior of the body.

In a typical form for the flow rates encountered in pool-water filtering, the inside diameter of inlet end 46 of the valve body is about 1.10 inches, and the bore through the body narrows to an inside diameter of about 0.51 inch at the smallest part of the venturi. The bore enlarges in diameter about 0.010 inch just upstream of passage 53. The bore sidewall downstream of passage 53 tapers outwardly at an angle of about 7 degrees to the axial centerline of the bore.

A valve closure member 56 has an enlarged and generally cylindrical head 57. An externally threaded stem 58 is integrally formed with and extends downwardly from head 57 to engage the internal threads in boss 51. An axially oriented inlet slot 59 interrupts the threads (FIG. 3) on stem 58, and the slot extends from the base of an enlarged shoulder 61 on the under surface of head 57 to an unthreaded reduced-diameter portion 62 of the stem beneath the threaded section and terminating in a conical tip 63.

In normal filter operation, air-injector valve 42 is closed by rotating head 57 to drive conical tip 63 into sealing engagement with valve seat 52 as shown in FIG. 2, thereby closing passage 53. When a filter-cleaning cycle is to be initiated as described in greater detail below, the valve is opened by unthreading the stem to separate tip 63 from seat 52.

Inlet end 46 of valve body 44 makes a slip fit within the downstream end of hose 20 which is connected to the outlet of the pump. The parts are secured in sealed engagement by a conventional clamp 66.

Positioned within tank 25 of the filter assembly is a filtration element 68 which is preferably arranged as a vertical stack of several filter cartridges 69. While these cartridges may be of any conventional type, a preferred style uses a non-woven synthetic-fiber polyester fabric which is pleated in generally cylindrical form to provide a large filtering area. As is conventional in filters of this type, incoming unfiltered water flows radially inwardly through the filter cartridges to a central passage (not shown) which enxtends vertically upward through the stacked cartridges for connection to the inner end of outlet fitting 30 in the filter-tank cap. That is, water flow is outside-in through the cartridges, and particulate matter being filtered from the water accumulates on the exterior surface of the cartridges.

The materials used to make these system components are largely conventional, but tank 25 is preferably made of a translucent plastic material as sold under the trademark "Lexan". This material has adequate structural strength to withstand the fluid forces induced during a cartridge-cleaning cycle, and the material is sufficiently transparent that the cartridge condition can be visually inspected from the outside of the tank. Valve body 44 and closure member 56 are preferably molded from an ABS resin material such as sold under the trademark "Cycolac T".

In normal filtering operation of the system, water is pumped from the pool through strainer 13 by pump 11, and the strained but unfiltered water is then pumped into tank 25 to flow inwardly through filter cartridges 69. The filtered water is delivered back to the pool through discharge hose 31. In this normal operating mode, air-injector valve 42 is closed, and auxiliary drain outlet 36 is also closed by cap 38.

During normal filter operation, contaminants gradually build up on the outer surfaces of the filter cartridges, and water flow rate through the filter correspondingly diminishes. The need for cleaning the filter cartridges can be detected by a visual inspection, by monitoring of line-pressure indicator 19, or by reference to a previously established cleaning schedule.

When it is determined that the cartridges require cleaning, pump 11 is turned off, and cap 38 is removed from the auxiliary outlet fitting. If desired, a hose may be connected to this fitting to direct the debris-laden water to be discharged from the tank to a convenient disposal point. The pump is then started, and air-injector valve 42 is opened by rotating closure member 56 to unseat conical tip 63 from valve seat 52. The system is then arranged in a cartridge-cleaning mode in which return flow to the pool is temporarily terminated.

The cartridge-cleaning mode, water is forced by the pump through venturi constriction 50 in valve boss 51, increasing the flow velocity of the liquid stream, and reducing the pressure at passage 53. This reduced pressure aspirates outside air through inlet slot 59 and passage 53 to inject a stream of air bubbles into the flowing water. The aerated water swirls into the tank to pass over the exterior surfaces of the filter cartridges, and an intensified cleaning action occurs as the air bubbles in the stream burst against the cartridge surfaces. The energy released in the expansion and bursting of these air bubbles has proved to be an effective aid in dislodging contaminates from the filter cartridge surfaces.

Operation in the cartridge-cleaning mode for about one and one-half minutes is normally adequate, and the air-injection valve is then closed and the pump turned off to terminate the cleaning cycle. Any debris-laden water remaining in the tank is allowed to drain through outlet fitting 36, and closure cap 38 is then replaced on this fitting. The pump is then re-energized, and air-bleed valve 29 is temporarily opened to bleed air from the tank as it is refilled with water. The air-bleed valve is then closed, and the system is returned to normal filtering operation.

This clean and simple cartridge-cleaning cycle requires only a few moments to complete, and no handling of the debris-laden cartridges by the user is required. In a normal installation, periodic operation of the system in the cartridge-cleaning mode greatly reduces the frequency with which the filter cartridges must be physically removed from the tank for scrubbing. Use of the air-injection valve thereby results in the availability of cleaner and more hygienic water for the swimming pool without burdening the pool owner with the unpleasant and often-shunned task of dismantling the filter for manual scrubbing of the cartridges.

There has been described a filter system which enables use of aerated water for periodic cleaning of filter cartridges without removing the cartridges from the filter tank. The system is easy to use, simple and economical to add to conventional filter systems, and results in a more efficient and effective filter system for applications such as filtration of swimming-pool water.

I claim:

1. A swimming-pool filter system, comprising:
a filter having a tank, a filtration element in the tank, a first outlet for delivering filtered water which has passed through the element, and a second sealable outlet for exhausting water directed against the element in a cleaning cycle;
a pump having an inlet for receiving unfiltered water from the pool, and having an outlet conduit connected to the filter tank to deliver unfiltered water under pressure to the element; and
an air-injection valve on the pump conduit, the valve being movable between an open position in which air is injected into unfiltered water flowing from the pump to the element to dislodge accumulated dirt during a cleaning cycle, and a closed position in which air injection is terminated and the system operates in a normal filtration mode with the second outlet closed.

2. The system defined in claim 1 wherein the valve is arranged to aspirate outside air into the unfiltered water.

3. The system defined in claim 1 wherein the air-injection valve comprises a valve body having a water passage therethrough, the passage defining a venturi construction, the body further having an air passage extending into the water passage, and a valve closure member for opening and closing the air passage.

4. The system defined in claim 3 wherein the valve closure member and valve body are threaded to mate with each other, and wherein one of the threads is interrupted by a slot for admitting air when the valve is in the open position.

5. The system defined in claim 1 wherein the tank has a generally cylindrical upright sidewall, and the pump outlet conduit is arranged to inject unfiltered water into the tank generally tangentially to the inner surface of the sidewall.

6. The system defined in claim 5 wherein the filtration element is a generally cylindrical upright cartridge.

* * * * *